June 30, 1942.  C. CRISWELL  2,287,866
VIBRATION DAMPER
Filed Oct. 19, 1940

Inventor
Carmer Criswell
By Blackmore, Spencer & Flint
Attorneys

Patented June 30, 1942

2,287,866

UNITED STATES PATENT OFFICE 2,287,866

VIBRATION DAMPER

Carmer Criswell, Detroit, Mich., assignor to General Motors Corporation, Detroit, Mich., a corporation of Delaware Application October 19, 1940, Serial No. 361,859

6 Claims. (Cl. 74—604)

This invention relates to means for diminishing vibration, particularly in the crankshafts of reciprocating engines.

The object is to reduce or eliminate as far as practicable transverse or beam vibrations of a shaft as distinguished from torsional or twisting and untwisting vibrations. A crankshaft, though of itself in satisfactory stationary and running balance is, during operation in an engine for example, subject to periodic impulses that tend to bend it, at one or more places in its length, out of its normal position which, by reason of its elasticity, the shaft tends to reassume. The crank arms, counterweights therefor and any other lateral projections or flanges that may be integral with or rigidly secured to the shaft between nodes vibrate also but in a general direction parallel to the normal position of the shaft axis. It is the purpose of the invention to reduce these vibrations as much as possible.

The invention consists in a shaft having one or more parts integral with or rigidly connected to it and projecting therefrom at substantially right angles, one or more of said parts having seats extending substantially parallel with the axis of the shaft, in combination with one or more damping bodies in contact with said seat or seats, said body or bodies being adapted to be forced against said seat or seats by centrifugal force and to dampen beam vibrations of said shaft by friction due to relative movement of said part or parts in a general longitudinal direction with respect to the shaft axis and said body or bodies. The projecting parts of the shaft in which seats for damping bodies may be formed may be crank cheeks, counterweights, flanges or the like, and the seats may be the walls of holes formed in or through the projecting parts. These holes for convenience of manufacture may be cylindrical in order that they may be formed by a rotary drill or boring tool and the damping masses may be corresponding cylindrical bodies.

In the accompanying drawing in which the same reference characters indicate the same parts throughout the several views.

Figure 1:
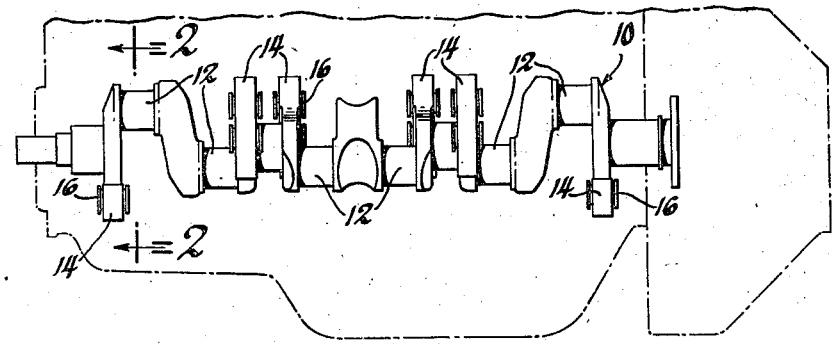
Fig. 1 represents a six throw crankshaft having six counterweights each counterweight having damping means constructed according to this invention.

Referring to Fig. 1, numeral 10 indicates a six throw crank for the purpose of illustrating one example of a crankshaft embodying the invention. The invention, however, is adapted to be used on any shaft subject to transverse or bending vibrations. In the figure the crank pins are indicated by numeral 12 and the counterweights by 14. Each counterweight in the example shown has one or more holes the axes of which extend substantially parallel with the shaft axis. In each hole is a body, 16, slightly smaller than the hole in transverse sectional area, said area lying in a plane transverse of the shaft axis.

Figure 2:
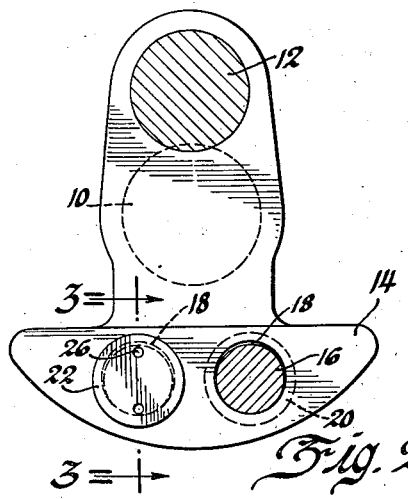
Fig. 2 is a section on a transverse plane 2—2 on Fig. 1, looking in the direction indicated by the arrows.
Figure 3:
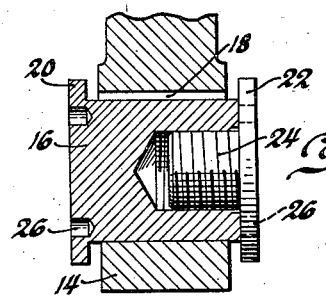
Fig. 3 is a section on the plane 3—3 in Fig. 2 viewed in the direction indicated by the arrow.

In the form of the invention illustrated in Figs. 2 and 3, each body 16, which may be referred to as a damping body, is most conveniently a cylinder seated in a cylindrical hole 18 extending parallel to the crankshaft axis into or through a crank throw counterweight 14. Provision must be made for relative movement between counterweight and damping body in the direction of the axis of the damping body and hole. Various means may be adopted for permitting this relative movement and also for limiting it so that the body will not separate from the counterweight. A convenient contrivance for this purpose is illustrated in Fig. 3, which shows body 16 to be provided with end flanges 20 and 22 of greater diameter than hole 18. The body has a length between the flanges greater than the axial length of the hole 18 and the thickness of the counterweight in the location thereof in order to permit relative movement of the counterweight and damping body in the general direction of the axis of the crankshaft, to an extent depending on the amplitude of the bending vibration.

Flange 22 in Fig. 3 is shown as the outer border portion of the head of a screw plug 24 screwed into a threaded bore in the damping body 16. Said screw-plug may be prevented from turning after insertion by any known means. The headed screw plug is a convenient means for enabling the body to be inserted in and removed from its seat in the counterweight. For convenience in tightening the plug 24 in the bore of damping body 16, or removing it therefrom, means such as sockets 26 may be provided for application of spanners or the like at both ends of the body.

Figure 5:
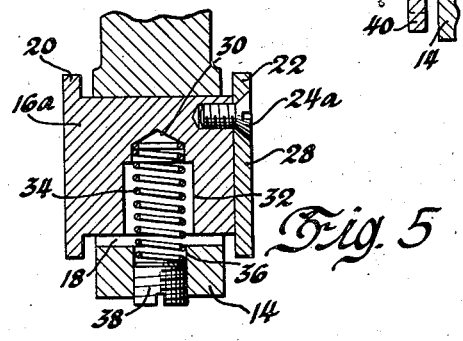
Fig. 5 is a section on the plane 5—5 of Fig. 4.
Figure 4:
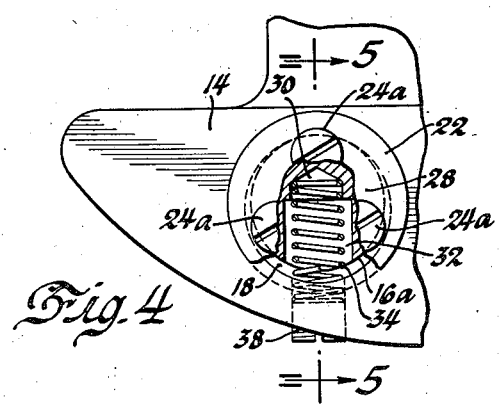
Fig. 4 is a fragmentary view showing a modification of the invention illustrated in Figs. 1 to 3.

In the modification illustrated in Figs. 4 and 5, the flange 22 on the damping body 16a is the border zone of plate 28 of larger diameter than the hole 18 in the counterweight 14. The plate 28 may be secured removably to one end of damping body 16a by means of machine screws 24a, three of which are shown in Fig. 4.

The damping body may be combined with elastic means tending to press it inward toward the axis of the crankshaft. The elastic force opposes centrifugal force and tends to prevent the body from being pressed against its seat in hole 18 at very high engine speeds so forcibly that relative movement between the counterweight 14 and the damping body cannot occur.

As one means of exerting a force in opposition to centrifugal force the device shown in Figs. 4 and 5 is proposed. In these figures body 16a is provided with a bore 30 and counterbore 32 extending into the body from its outer surface and part way through in a diametrical direction about midway of its ends. One end of a coiled expansion spring 34 is seated in the inner end of bore 30 while the other end is seated in a socket 36 in the counterweight 14, the socket communicating with hole 18 midway of its length and at the side most distant from the shaft axis. Socket 36 may be formed by drilling through the counterweight into hole 18 and inserting a screw plug 38 in the drilled hole so that the inner end of the plug will constitute the bottom of the socket 36 for receiving the outer end of spring 34. Spring 34 is confined by bore 30 and socket 36 only at its extremities. The counterbore 32 provides clearance to allow relative movement of counterweight and damping mass in the direction of the axis of the latter and limits the rotary movement of the damping mass 16a which is intended to have a damping effect on transverse vibrations but not on torsional vibrations. The cross-sectional area of hole 18 is only enough larger than that of the damping body so that the counterweight and body may move relatively to one another with sufficient freedom to respond promptly to vibrations. The damping body should fit in the hole formed in the counterweight or other laterally projecting portion of the shaft with the clearance customary in plain lubricated bearings.

Spring 34 besides opposing centrifugal force and limiting rotary movement of a cylindrical damping body also acts to restore the body to median position with respect to the counterweight after longitudinal displacement has occurred. It further tends to limit the amplitude of relative movement and render the end flanges unnecessary, although use of the flanges is preferred.

Figure 6:
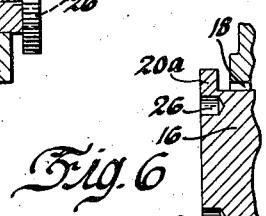
Fig. 6 is a fragmentary sectional view similar to Fig. 3 of a modified form of cylindrical damping body having greater weight on the side farther from the axis of rotation of the shaft than on the side nearer thereto.

As a substitute for spring 34 as a means to check rotational movement of cylindrical damping bodies said bodies may be eccentrically weighted as shown in Fig. 6, in which one of the end flanges 20a corresponding to either end flange 20 or 22, has a projecting mass 40 at one side only. The flange on the other end of the damping body, it will be understood, may and preferably should be provided with a similar mass. Centrifugal force will tend to keep the body, thus made heavier on one side of the axis than on the other, from rotative displacement.

In operation the tendency of the damping body will be to maintain any given point of it, such as the center of gravity, rotating in one plane. Should the crankshaft vibrate transversely, or periodically bend in opposite senses, a damping body disposed on a seat suitably located in the shaft or a part fixed to it will tend to damp those vibrations because the vibrating part of the shaft will move with respect to the damping body thus causing sliding friction.

If there are several nodes in a transversely vibrating shaft, a plurality of damping bodies may be disposed at suitable locations along the shaft. As shown in Fig. 1 damping bodies are slidably mounted on each counterweight. It is preferred to place two or more damping bodies in a counterweight. As the damping bodies do not have to be tuned to a given frequency, as is necessary with dynamic vibration absorbers, some damping effect is attainable with bodies of any reasonable mass. The numbers or weight of the damping bodies may be increased wherever it is necessary to increase the damping friction provided care be taken to so dispose the bodies as to maintain rotative balance.

It will be understood that the damping bodies as shown in Fig. 1 constitute a part of each counterweight mass functioning to balance the opposed crank arms and pins, but that their weight does not affect the natural frequency of the shaft when vibrating transversely, the natural frequency then being the same as it would be with the damping bodies removed. In consequence the frequency is higher than the frequency of the same shaft having solid counterweights. It is well understood that resonance vibrations may sometimes be avoided by changing the natural frequency of vibration of a shaft as by adding or subtracting weight. The described arrangement enables the natural frequency of a shaft, as a transversely vibrating rod, to be raised while retaining the necessary masses in the counterweights for counterbalancing the cranks or other off-center masses.

I claim:

1. A rotatable shaft subject to disturbing impulses causing it to vibrate transversely, a part rigid with the shaft extending outward therefrom substantially normal to the shaft axis, said part having a hole therein, extending substantially parallel with the shaft axis, a damping body seated in said hole and capable of sliding therein in an axial direction and a spring arranged to exert its force on said body in opposition to centrifugal force during rotation of the shaft.

2. A rotatable shaft subject to disturbing impulses causing it to vibrate transversely, a part rigid with the shaft extending outward therefrom substantially normal to the shaft axis, said part having a hole round in cross section therein extending substantially parallel with the shaft axis, a damping body round in cross section seated in said hole and capable of relative sliding movement therein in an axial direction, and means tending to prevent rotational movement of the body within said hole.

3. A combination as defined in claim 2 in which the means tending to prevent rotational movement of the damping body within said hole consists of an eccentrically disposed unbalanced mass on said body in order that centrifugal force shall maintain said body with the heavier portion outward with respect to the shaft axis.

4. A combination as defined in claim 2 in which the damping body is longer than the hole in the part extending outward from the shaft and its ends provided with limiting stops having a heavier part on one side of the body axis than at the opposite side.

5. A rotatable shaft subject to disturbing impulses causing it to vibrate transversely, a part rigid with the shaft extending outward therefrom substantially normal to the shaft axis, said part having a cylindrical hole therein extending substantially parallel with the shaft axis, a cylindrical damping body seated in said hole and capable of relative sliding movement therein in an axial direction, elastic means engaging said part and said damping body and tending to restore said damping body to the median position with respect to said part.

6. A rotatable shaft subject to disturbing impulses causing it to vibrate transversely, a part rigid with the shaft extending outward therefrom substantially normal to the shaft axis, said part having a cylindrical hole therein extending substantially parallel with the shaft axis, a cylindrical damping body seated in said hole, said damping body having therein a diametrical hole extending part way through it, an expansion coil spring having its outer end socketed in the part extending outward from the shaft and its inner end engaging the damping body, said diametrical hole being larger than the spring for providing clearance between spring and body to permit relative endwise reciprocation of the body with respect to the part in which it is seated.

CARMER CRISWELL.